United States Patent
Asahara et al.

(10) Patent No.: US 9,542,717 B2
(45) Date of Patent: Jan. 10, 2017

(54) DISPLAY DEVICE AND INFORMATION COLLECTING METHOD USING THE SAME

(71) Applicant: Furuno Electric Co., Ltd., Nishinomiya (JP)

(72) Inventors: Tatsuya Asahara, Nishinomiya (JP); Tadahiro Miichi, Nishinomiya (JP); Keita Nishida, Nishinomiya (JP); Hiroshi Yoshii, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 211 days.

(21) Appl. No.: 14/255,831

(22) Filed: Apr. 17, 2014

(65) Prior Publication Data

US 2014/0313212 A1    Oct. 23, 2014

(30) Foreign Application Priority Data

Apr. 18, 2013 (JP) .................. 2013-087613

(51) Int. Cl.

| | |
|---|---|
| *G06T 1/60* | (2006.01) |
| *G09G 3/00* | (2006.01) |
| *B63B 49/00* | (2006.01) |
| *G09G 5/14* | (2006.01) |
| *G07C 5/08* | (2006.01) |

(52) U.S. Cl.
CPC .............. *G06T 1/60* (2013.01); *G09G 3/006* (2013.01); *B63B 49/00* (2013.01); *G07C 5/08* (2013.01); *G09G 5/14* (2013.01); *G09G 2320/0606* (2013.01); *G09G 2320/08* (2013.01); *G09G 2370/20* (2013.01)

(58) Field of Classification Search
CPC .......... G01S 13/862; A61B 17/154; G06T 1/60
See application file for complete search history.

(56) References Cited

U.S. PATENT DOCUMENTS

| | | | |
|---|---|---|---|
| 2002/0004695 A1 | 1/2002 | Glenn et al. | |
| 2005/0162268 A1 | 7/2005 | Grindstaff et al. | |
| 2005/0278631 A1 | 12/2005 | Kamio | |

(Continued)

FOREIGN PATENT DOCUMENTS

JP    2006071337 A    3/2006

OTHER PUBLICATIONS

European Patent Office, Extended European Search Report of EP14165109.1, Aug. 1, 2014, Germany, 9 pages.

(Continued)

*Primary Examiner* — Phi Hoang
(74) *Attorney, Agent, or Firm* — Alleman Hall McCoy Russell & Tuttle LLP

(57) ABSTRACT

A display device is provided. The device includes memories, a display unit, and a data collecting memory. The memories store a plurality of kinds of image data generated based on information acquired from different kinds of sensors, respectively. The display unit displays the image data that is selected by a user among the plurality of kinds of image data. The data collecting memory stores, in response to a predetermined report instruction, at least data of an image displayed on the display unit at the timing of the report instruction and, among the image data stored in the memories at the timing of the report instruction, the image data that is not displayed on the display unit.

18 Claims, 2 Drawing Sheets

(56) References Cited

U.S. PATENT DOCUMENTS

| | | | | |
|---|---|---|---|---|
| 2009/0002189 A1* | 1/2009 | Liu | ............... | H04L 12/2825 340/691.6 |
| 2009/0202347 A1* | 8/2009 | Rugger | ............ | F03D 7/0204 416/31 |
| 2010/0063508 A1* | 3/2010 | Borja | ............... | A61B 17/154 606/88 |
| 2014/0013272 A1* | 1/2014 | Thomas | ............ | G06F 3/04842 715/800 |
| 2014/0269162 A1* | 9/2014 | Antao | ............... | G01S 13/862 367/7 |

OTHER PUBLICATIONS

Appleby, R. et al., "Millimeter-Wave and Submillimeter-Wave Imaging for Security and Surveillance," Proceedings of the IEEE, vol. 95, No. 8, Aug. 2007, 8 pages.

European Patent Office, Office Action Issued in European Patent Application No. 14165109.1, Jun. 16, 2016, Germany, 11 pages.

* cited by examiner

DISPLAY DEVICE AND INFORMATION COLLECTING METHOD USING THE SAME

CROSS-REFERENCE TO RELATED APPLICATION(S)

This application claims priority under 35 U.S.C. §119 to Japanese Patent Application No. 2013-087613, which was filed on Apr. 18, 2013, the entire disclosure of which is hereby incorporated by reference.

TECHNICAL FIELD

The present invention relates to a configuration which accurately transmits, when an error occurs in a display device, information of the error to a support.

BACKGROUND OF THE INVENTION

Ships are generally provided with display devices which display a radar image created by a radar apparatus, a fish finding image created by a fish finder, a chart image created by a plotter apparatus, and various information including voyage information, such as latitude and longitude.

When some kind of abnormality occurs in such devices, a user generally calls a support center of the manufacturer of the device concerned, explains the situation, and receives support services, such as providing a method of fixing the abnormality. For example, when the radar image is not displayed appropriately, the user explains the symptom to an operator of the support center over the telephone.

However, the symptom that shows up on the radar image, although obvious in visual, is difficult to orally explain in many cases. Therefore, it is not easy for the user to orally explain exactly what the abnormality occurring in the display device is over the telephone. Moreover, it is also difficult for the operator of the support center to provide adequate support based on the little information given from the user over the telephone. Thus, it takes time to find out the cause of the abnormality in many cases.

Therefore, it can be considered that the user takes a picture of the display screen of the display device with, for example, a camera built in a mobile phone, and sends the data of the picture image to the support center. In this case, the operator of the support center can visually check the display screen of the display device with the abnormality by the image, and thus, the cause of the abnormality occurring in the display device becomes easier to identify.

However, the process of taking the picture of the display screen with the camera and sending the data of the picture image is troublesome to the user. Therefore, the support center feels reluctant to request the user to go through the process. Thus, in the actual scene, it is unlikely for the user to take the picture of the display screen with the abnormality and send it to the support center.

Meanwhile, in the field of ships, voyage data recorders (VDR) have been known. JP2006-071337A discloses such VDR which is configured to store image data obtained by a radar.

If the image data is stored as the VDR in JP2006-071337A does, when abnormality occurs in a display device, a user does not need to take a picture of the display screen with a camera. The stored image data can be considered useful in determining the cause of abnormality. However, the VDR in JP2006-071337A is for analyzing the data when a marine accident occurs, and determining the cause thereof, and is not for maintenance of navigational instruments. A VDR is generally for acquiring and storing predetermined data at all times so that if an accident occurs, the cause thereof can be determined, and therefore, the volume of the stored data becomes enormous. Therefore, even if the configuration of JP2006-071337A is simply applied to a display device to store data, it cannot be said that the cause of abnormality can be determined smoothly when it occurs in the display device.

SUMMARY OF THE INVENTION

The present invention is made in view of the above situations, and mainly aims to provide a display device which has a function to automatically collect and store required information so that when abnormality occurs, the cause thereof can be determined.

According to one aspect of the present invention, a display device having the following configuration is provided. That is, the display device includes memories, a display unit, and a data collecting memory. The memories store a plurality of kinds of image data generated based on information acquired from different kinds of sensors, respectively. The display unit displays the image data that is selected by a user among the plurality of kinds of image data. The data collecting memory stores, in response to a predetermined report instruction, at least data of an image displayed on the display unit at the timing of the report instruction and, among the image data stored in the memories at the timing of the report instruction, the image data that is not displayed on the display unit.

For example, when abnormality occurs, by storing the image displayed on the display unit as data, the image can be used in determining the cause of the abnormality. Note that, there is a case where the data of the image displayed on the display unit only is not sufficient in determining the cause of the abnormality. Thus, by storing the image data which is not displayed on the display unit (non-displayed image data), the image data can be used in determining the cause of the abnormality.

In response to the report instruction, the data collecting memory may also store a display setting value of the display unit at the timing of the report instruction.

By storing the display setting value of the display unit as described above, the display setting value can be used in determining the cause of the abnormality.

In response to the report instruction, the data collecting memory may also store setting values of the sensors at the timing of the report instruction.

By storing the setting values of the sensors as described above, contents of the image data generated based on the information from the sensors can be evaluated accurately, and thus, the setting values can be used in determining the cause of the abnormality.

The display device may also include a user interface through which the report instruction is inputted.

Thus, when the user notices some sort of abnormality, the user, by inputting the report instruction through the user interface, can cause the data collecting memory to store required information with one-touch operation.

The sensors may include at least one of a radar apparatus, a fish finder, and a GPS receiver.

Thus, the display device can generate the image data, such as a radar image, a fish finding image, and/or a chart image of a current position of the display device.

Instrument data may be displayed on the display unit, along with the image data selected by the user. In response to the report instruction, the data collecting memory may also store the instrument data at the timing of the report instruction.

By storing the instrument data at the timing of the report instruction as described above, the instrument data can be used in determining the cause of the abnormality.

In the image data stored in any one of the memories, when only a part of the image data is displayed on the display unit, the data collecting memory may store, as the non-displayed image data, at least the other part of the image data.

By storing the part of the image data which is not displayed (the part corresponding to an area outside a displayed area) as the non-displayed image data, the part of the image data can be used in determining the cause of the abnormality.

The data collecting memory may store, as the non-displayed image data, the image data of a kind at least different from the image data displayed on the display unit.

By storing the image data of the kind which is not displayed as the non-displayed image data as described above, this image data can be used in determining the cause of the abnormality.

The display device may also include a transmitter configured to transmit the data stored in the data collecting memory to external instrument.

By transmitting the data that is stored when the abnormality occurs to, for example, a support center, it becomes easier for the support center to determine the cause of the abnormality.

When the data collecting memory newly stores data in response to the report instruction, the transmitter may determine whether the data is transmittable, when the data is not transmittable, the transmitter may wait to transmit the data, and when the data becomes transmittable, the transmitter may transmit the data.

Thus, the data can automatically be transmitted at a suitable timing.

According to another aspect of the present invention, the following information collecting method of a display device is provided. That is, the information collecting method includes: generating, based on information acquired from different kinds of sensors, a plurality of kinds of image data corresponding to the sensors, respectively; storing the plurality of kinds of generated image data in memories, respectively; displaying, on a display unit, the image data that is selected by a user among the plurality of kinds of image data; and storing, in response to a predetermined report instruction, at least data of an image displayed on the display unit at the timing of the report instruction and, among the image data stored in the memories at the timing of the report instruction, the image data that is not displayed on the display unit.

For example, when abnormality occurs, by storing the image displayed on the display unit as data, the image can be used in determining the cause of the abnormality. Note that, there is a case where the data of the image displayed on the display unit only is not sufficient in determining the cause of the abnormality. Thus, by storing the image data which is not displayed on the display unit (non-displayed image data), the image data can be used in determining the cause of the abnormality.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
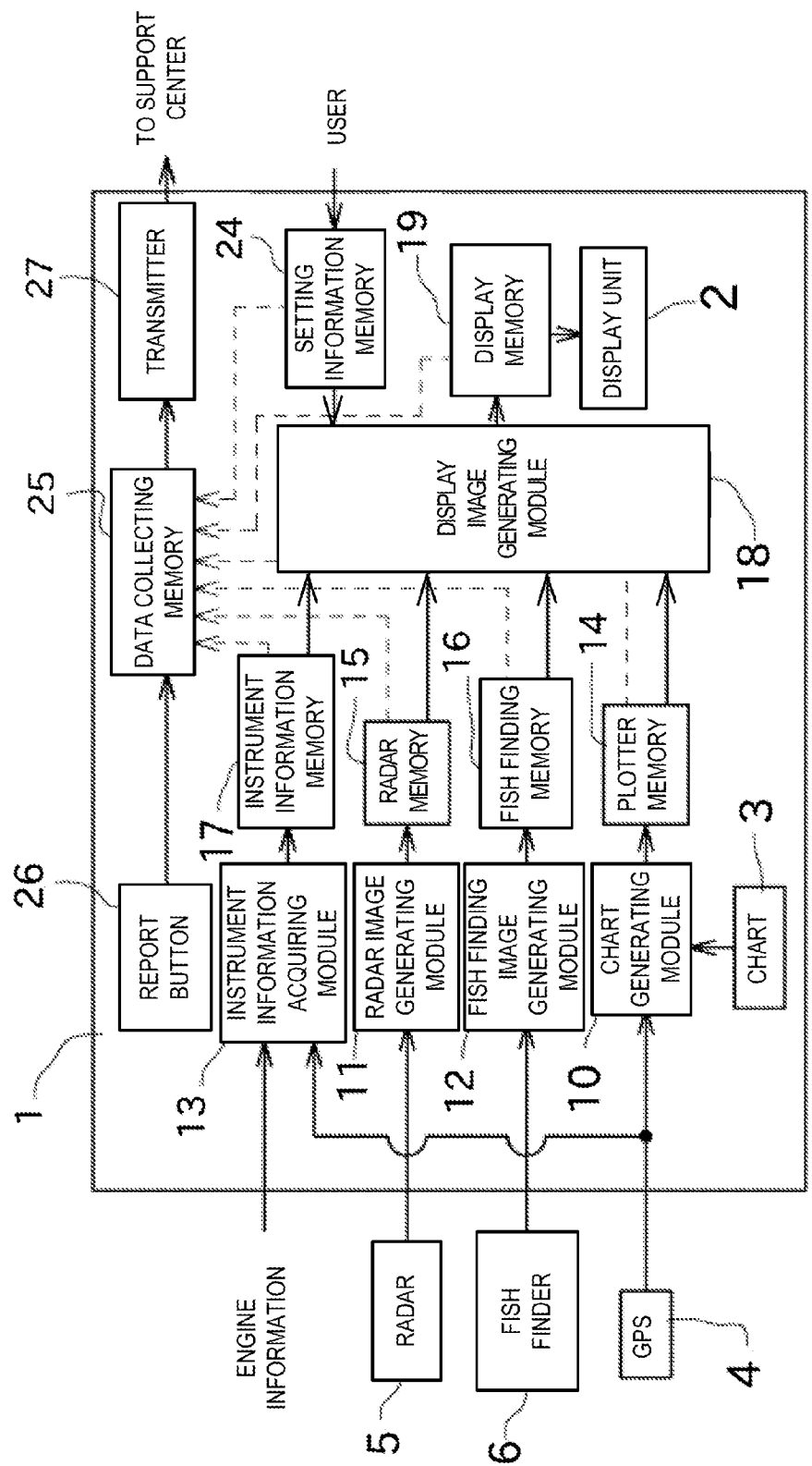
FIG. 1 is a block diagram of a display device according to one embodiment of the present invention.

Next, one embodiment of the present invention is described with reference to the accompanying drawings. FIG. 1 is a block diagram of a display device 1 according to this embodiment of the present invention.

The display device 1 of this embodiment is installed in a ship and configured as a so-called GPS (Global Positioning System) plotter for displaying a chart (nautical chart) around the ship and the like.

The display device 1 includes a display unit 2. The display unit 2 graphically displays information, such as the chart, and is a liquid-crystal color display, for example.

The display device 1 includes a chart memory 3 stored with electric data of the chart to be displayed on the display unit 2. Moreover, the display device 1 of this embodiment is connected with an external GPS antenna 4. The GPS antenna 4 may be built in a main body of the display device 1.

The display device 1 of this embodiment is connected with a radar apparatus 5 and a fish finder 6. The display device 1 of this embodiment displays, on the display unit 2, a radar image generated based on information acquired from the radar apparatus 5 and a fish finding image created based on information acquired from the fish finder 6.

Each of the radar apparatus 5, the fish finder 6, and the GPS antenna 4 can be said to be a kind of a sensor in view of detecting some sort of information and outputting it.

Further, the display device 1 of this embodiment receives information (operational information) regarding an operation state of respective components of the ship, such as engine information (e.g., engine speed) regarding an engine of the ship. Such information is detected by suitable sensor(s). Moreover, the display device 1 receives information, such as voyage information (e.g., latitude and longitude). Note that, in this embodiment, the voyage information can be acquired based on the output from the GPS antenna 4. Such operational information and voyage information described above can be confirmed by conventional ship instruments. Thus, such information is referred to as instrument information. The display device 1 of this embodiment suitably displays the instrument information on the display unit 2.

Next, a specific configuration of the display device 1 is described in detail.

The display device 1 of this embodiment includes background memories (a plotter memory 14, a radar memory 15, a fish finding memory 16, and an instrument information memory 17) corresponding to the different kinds of plurality of sensors described above.

The plotter memory 14 stores image data of the chart to be displayed (a part of the electric data of the chart stored in the chart memory 3). The radar memory 15 stores data of the radar image. The fish finding memory 16 stores data of the fish finding image. Moreover, the instrument information memory 17 stores data of the instrument information to be displayed on the display unit 2 of the display device 1.

Moreover, the display device 1 of this embodiment includes image data generating modules (a chart generating module 10, a radar image generating module 11, and a fish finding image generating module 12) that generate the image data (the chart, the radar image, and the fish finding image) based on the information from the sensors.

The chart generating module 10 acquires current coordinates (latitude and longitude) of the ship based on the information acquired from the GPS antenna 4. Moreover, the chart generating module 10 acquires the data of the chart showing the surrounding of the acquired current coordinates by reading it from the chart memory 3. Note that, the chart generating module 10 can acquire, not only the current coordinates based on the GPS, but also the data of the chart of arbitrary coordinates specified by a user, for example.

The plotter memory 14 is configured as an image memory which stores raster image data. The chart generating module 10 causes the plotter memory 14 to store the image data of the acquired chart. Thus, the image data of the chart can be generated in the plotter memory 14.

When the ship moves and the current coordinates (current position) are changed, or when the user specifies different coordinates, the chart generating module 10 acquires from the chart memory 3, image data of a chart showing the surrounding of the new coordinates and causes the plotter memory 14 to store it. Thus, the image data of the chart stored in the plotter memory 14 can be updated as needed.

The radar image generating module 11 acquires, from the radar apparatus 5, echo data obtained by the radar apparatus 5 through a transmission of a radio wave.

The radar memory 15 is configured as an image memory which stores raster image data. The radar image generating module 11 causes the radar memory 15 to store, in its corresponding address, the echo data acquired from the radar apparatus 5. Thus, the data of the radar image can be generated in the radar memory 15. Note that, the detailed description of the configuration of generating the radar image based on the echo data from the radar apparatus 5 is omitted since it is known.

Every time the latest echo data is acquired from the radar apparatus 5, the radar image generating module 11 causes the radar memory 15 to store the latest echo data in its corresponding address. Thus, the data of the radar image stored in the radar memory 15 can be updated as needed.

The fish finding image generating module 12 acquires, from the fish finder 6, echo data obtained by the fish finder 6 through a transmission of an ultrasonic wave.

The fish finding memory 16 is configured as an image memory which stores raster image data. The fish finding image generating module 12 causes the fish finding memory 16 to store, in its corresponding address, the echo data acquired from the fish finder 6. Thus, the data of the fish finding image can be generated in the fish finding memory 16. Note that, the detailed description of the configuration of generating the fish finding image based on the echo data from the fish finder 6 is omitted since it is known.

Every time the latest echo data is acquired from the fish finder 6, the fish finding image generating module 12 causes the fish finding memory 16 to store the latest echo data in its corresponding address. Thus, the data of the fish finding image stored in the fish finding memory 16 can be updated as needed.

Moreover, the display device 1 of this embodiment includes an instrument information acquiring module 13 for acquiring the instrument information. As described above, specific examples of the instrument information include the engine information and the voyage information; however, not limited to this, it may be any information as long as it can be confirmed by a ship instrument. Such instrument information can be detected by suitable sensors. The instrument information acquiring module 13 acquires the instrument information based on output signals from the sensors.

The instrument information memory 17 stores data of the instrument information. Every time the latest instrument information is acquired from the sensors and the like, the instrument information acquiring module 13 causes the instrument information memory 17 to store the data of the latest instrument information. Thus, the data of the instrument information stored in the instrument information memory 17 can be updated as needed.

The display device 1 of this embodiment includes a display image generating module 18. The display image generating module 18 suitably reads the data of the image and the instrument information stored in the back ground memories 14, 15, 16 and 17 and applies predetermined display processing on the data, so as to generate display image data. Note that, specific examples of "the display processing" which the display image generating module 18 performs on the image data include various processing which can generally be performed on image data, for example, zooming, rotating, synthesizing, trimming, and filtering.

Moreover, the display device 1 of this embodiment includes a display memory 19. The display image data generated by the display image generating module 18 is stored in the display memory 19. The display image data stored in the display memory 19 is transferred to the display unit 2 at a predetermined cycle. Thus, the display image data can be displayed on the display unit 2.

Figure 2:
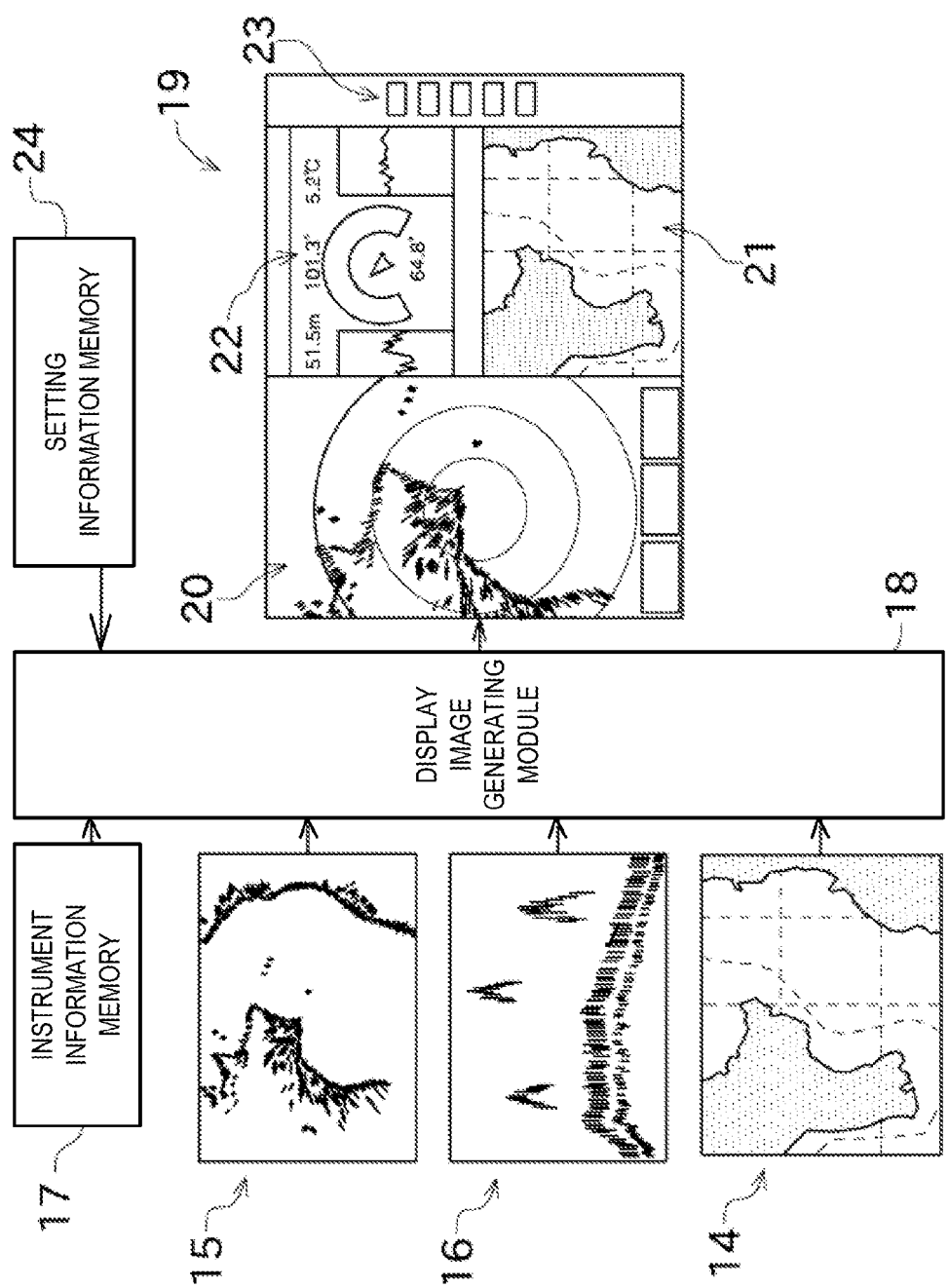
FIG. 2 is a view illustrating conceptual contents of image data stored in memories.

The contents of the image data stored in the background memories 14, 15 and 16, and the display memory 19 are conceptually illustrated in FIG. 2.

In the example of FIG. 2, the display image data stored in the display memory 19 is provided with a radar image display area 20 for displaying a part of the radar image stored in the background memories 15. Moreover, the display image data is provided with a chart display area 21 for displaying the chart and an instrument information display area 22 for displaying various instrument information. Further, an area for displaying a GUI (Graphical User Interface) 23 on which the user operates is secured in the display image data. By displaying the display image data on the display unit 2, the radar image, the chart, and the instrument information can be displayed simultaneously, and the GUI 23 can be provided to the user.

The user can set a display mode of the image to be displayed on the display unit 2 (perform display setting). The display image generating module 18 generates the display image data based on value(s) set by the user in the display setting. For example, the user can adjust, by setting, positions and sizes of the display areas 20, 21 and 22 included in the display image data illustrated in FIG. 2. In this case, the display image generating module 18 generates the display image data by adjusting the positions and the sizes of the display areas 20, 21 and 22 to match the values set by the user in the display setting.

Moreover, the user can suitably change the kind of the information to be displayed on the display unit 2. For example, in the example of the display image data in FIG. 2, although an area for displaying the fish finding image is not provided, the user can change the display setting so that the fish finding image is displayed as needed. In this case, the display image generating module 18 generates the display image data including the area for displaying the fish finding image. Thus, the fish finding image can be displayed on the display unit 2. Moreover, in the display image data of FIG. 2, although the three kinds of information (the radar image, the chart, and the instrument information) are displayed simultaneously, the user can change the display setting so that only one or two kinds of information are displayed, in other words, the user can select the image data to be displayed.

Moreover, the user can set the display mode of each of the images in the display areas (the display areas 20, 21 and 22 in FIG. 2). For example, the user can set a display range and a scale of the radar image to be displayed in the radar image display area 20. Moreover, for example, the user can set a display position of the ship in the chart to be displayed in the chart display area 21, and a scale of the chart. These display modes can be set for each kind of the image data. For example, different scales can be set for the radar image and the chart.

The display device 1 includes a setting information memory 24 for storing, as data, the values set by the user in the display setting. The display image generating module 18 reads the data of the display setting stored in the setting information memory 24 and generates the display image data based on the read data. As described above, according to the selection made by the user, the display image generating module 18 generates the display image data based on a part or all of the image data stored in the background memories 14, 15 and 16.

Note that, the setting information memory 24 also stores setting values regarding the respective sensors (the radar apparatus 5, the fish finder 6, and the GPS antenna 4). Specific examples of the setting values regarding the radar apparatus 5 include a pulse transmission cycle and a transmission pulse width. The image data generating modules 10, 11 and 12 generates the image data based on the setting values. Thus, the image data can be generated suitably based on the settings of the sensors.

Next, a characteristic configuration of the display device 1 of this embodiment is described.

The display device of this embodiment also includes a data collecting memory 25, a report button 26, and a transmitter 27.

The report button (user interface) 26 is for the user to input "a report instruction." The report button 26 of this embodiment is configured as a physical button which can be controlled by the user.

In response to the report button 26 being controlled by the user (the report instruction being inputted), the data collecting memory 25 reads, copies and stores the data which is stored in the display memory 19 at the timing of the input of the report instruction (the image displayed on the display unit 2 at the timing of the input of the report instruction). Additionally, the data collecting memory 25 also reads, copies and stores the latest data stored in the background memories 14, 15, 16 and 17 and the setting information memory 24 at the timing of the input of the report instruction.

When the latest data is newly stored in the data collecting memory 25, the transmitter 27 automatically transmits the data to an external device (in this embodiment, a server at a support center).

The information collecting method applied to the display device 1 configured as above is described as follows.

First, based on the information from the different kinds of plurality of sensors (the radar apparatus 5, the fish finder 6, and the GPS antenna 4), the image data generating modules 10, 11 and 12 generate the image data (the chart, the radar image, and the fish finding image) corresponding to the respective sensors.

The plurality of kinds of image data generated by the image data generating modules 10, 11 and 12 are stored in the background memories 14, 15 and 16, respectively.

Among the plurality of kinds of image data, based on the image data selected by the user in the display setting, the display image data is generated. Then, the display image data is displayed on the display unit 2.

When the user controls the report button 26 to input the report instruction, in response to this, the data collecting memory 25 stores the plurality of kinds of latest image data (the chart, the radar image, and the fish finding image) stored in the background memories 14, 15 and 16 at the timing of the input of the report instruction, the data of the image displayed on the display unit 2 (the display image data stored in the display memory 19) at the timing of the input of the report instruction, and the data stored in the setting information memory 24 and the instrument information memory 17.

By the information collecting method described above, the user can, by only controlling the report button 26, cause the data collecting memory 25 to store various kinds of data acquired by that timing of the report button 26 being controlled.

That is, with the conventional display device, when some kind of abnormality occurs in the display device, the user needs to orally explain the contents of the abnormality occurring in the display device to an operator of the support center over the telephone, and it has been difficult to pass on the situation accurately.

Whereas, with the display device 1 of this embodiment, with only one-touch operation of controlling the report button 26, the various kinds of data can be stored in the data collecting memory 25. Therefore, in the case where the abnormality occurs, when the user controls the report button 26, the data collecting memory 25 automatically collects and stores the data indicating the situation during the abnormality. Thus, the user can accurately pass on the situation during the abnormality by sending the data stored in the data collecting memory 25 to the support center or the like. Moreover, it becomes easier for the operator of the support center or the like to determine the situation of the abnormality by checking the sent data. Thus, the operator can provide more accurate support to the user.

Moreover, as described above, when the data collecting memory 25 newly stores the latest data, the transmitter 27 of this embodiment automatically transmits the data to the server of the support center. Therefore, it becomes unnecessary for the user to send the data to the support center. According to this, the user can receive adequate support by performing simple operation of controlling the report button 26.

The method for the transmitter 27 to transmit the data is not particularly limited. Note that, in view of providing the display device 1 of this embodiment in the ship, the transmitter 27 is preferred to transmit the data by wireless communication which can be used on the sea. Especially in recent years, wireless data communication on the sea has been gradually developed and preparation for an environment where online support can be provided on the sea has been in progress. Examples of such wireless data communication include satellite data communication, 3G lines, and Wifi, and also suitable wireless data communication network can be utilized.

Note that, when the transmitter 27 uses a wireless line, a situation may occur, where the transmission of data by the transmitter 27 cannot be performed, for example, when the display device 1 is outside the communicable area. Thus, when the data collecting memory 25 newly stores the latest data (when the report button 26 is controlled by the user), the transmitter 27 determines whether the data is transmittable (whether the display device is within the communicable area). If it is determined to be transmittable, the transmitter 27 transmits the data. If it is determined to be not transmittable, the transmitter 27 waits before transmitting the data, and when it is determined to be transmittable thereafter, it automatically transmits the data kept waiting for the transmission.

It is suitable if the operation of storing in the data collecting memory 25 and the subsequent operation of transmitting the data by the transmitter 27 can be performed independently from the main process which is operated in the display device 1 (e.g., an operating system (OS)). By this, even when an abnormality occurs in the OS of the display device 1 for example, by controlling the report button 26, the required data can surely be stored in the data collecting memory 25 and transmitted by the transmitter 27.

Next, the kinds of the data to be transmitted by the display device 1 of this embodiment to the support center are described.

As described above, the data collecting memory 25 stores the display image data stored in the display memory 19, in response to the control on the report button 26. Since the display image data is the data of the image displayed on the display unit 2 at the timing of the report button 26 being controlled, it can be said as a capture image of the display screen viewed by the user during the abnormality. By transmitting the display image data (the data of the image displayed on the display unit 2) to the support center, the operator of the support center can accurately determine the situation of the display device 1 during the abnormality.

However, in view of determining the cause of the abnormality, there is a case where transmitting only the display image data during the abnormality (the data of the image displayed on the display unit 2) is insufficient.

For example, in the display image data illustrated in FIG. 2, the radar image display area 20 displays, in an enlarged manner, an area corresponding to a part of the data of the radar image stored in the radar memory 15. In other words, the rest of the radar image (the part outside the area) is not displayed on the display unit 2 (in a non-displayed state) since it is outside the radar image display area 20. However, there is a case where the image data of the non-displayed part is required for determining the cause of the abnormality.

In this regard, the data collecting memory 25 of this embodiment, when the report button 26 is controlled, stores the latest image data stored in the background memories 14, 15 and 16 at the timing when the report button 26 is controlled. The image data stored in the background memories 14, 15 and 16 is complete image data including the part which is not displayed on the display unit 2 (non-displayed part). Therefore, it can be said that the data collecting memory 25 of this embodiment also stores the image data which is not displayed on the display unit 2 at the timing when the report button 26 is controlled.

Then the transmitter 27 of this embodiment also transmits the image data acquired from the background memories, to the support center along with the display image data. Therefore, the operator of the support center can refer, not only to the display image data (the data of the image displayed on the display unit 2), but also to the image data of the part which was not displayed on the display unit 2 (non-displayed part). Thus, the operator can more accurately determine the cause of the abnormality.

As a specific case example, a case where abnormality in which an unnatural echo appears on the radar image in the radar image display area 20 (see FIG. 2) occurs is considered. The unnatural echo may be a false image caused by multipath, for example. In this case, the support center requires, as a part of information to be used for determining whether the unnatural echo is caused by multipath, information regarding the situation of buildings and land in the surrounding during the abnormality.

However, in the display image data in FIG. 2, since the radar image is partially outside the radar image display area 20 (partially not displayed), the situation of buildings and land in the surrounding during the abnormality cannot sufficiently be grasped based on the display image data.

In this regard, with the configuration of this embodiment, the data of the latest radar image stored in the radar memory 15 at the timing of the abnormality occurrence is transmitted to the support center, the operator of the support center can refer to the radar image of the part outside the radar image display area 20 (the non-displayed part). Therefore, the possibility that the operator can accurately determine the situation of buildings and land in the surrounding during the abnormality increases. Thus, the operator can more accurately determine whether the unnatural echo is caused by the multipath.

Moreover, for example, in the display image data illustrated in FIG. 2, the ranges for displaying the chart and the radar image respectively are provided, but the area for displaying the fish finding image is not provided. In other words, the image data of the chart and the radar image are "the kinds that are displayed on the display unit 2," and the data of the fish finding image is "the kind that is not displayed on the display unit 2 (non-displayed kind)."

The data collecting memory 25 of this embodiment, in response to the report button 26 being controlled, stores the plurality of kinds of image data (the chart, the radar image, and the fish finding image) stored in the background memories 14, 15 and 16. That is, it can be said that the data collecting memory 25 of this embodiment stores, in addition to the kinds of image data which are displayed on the display unit 2 (the image data of the chart and the radar image in the example of FIG. 2), the kind of the image data (the image data of the fish finding image in the example of FIG. 2) different to the displayed kinds.

By this, the operator of the support center can refer to, in addition to the display image data (the data of the images displayed on the display unit 2), the kind (non-displayed kind) of image data which is not displayed on the display unit 2 (the image data of the fish finding image in the example of FIG. 2). Therefore, the operator can refer to the various kinds of image data regardless of whether they are displayed on the display unit 2 during the abnormality, and thus, he/she can combinedly utilize the data in determining the cause of the abnormality.

Further, the data collecting memory 25 of this embodiment, when the report button 26 is controlled, also stores the data of the instrument information stored in the instrument information memory 17. Then, the transmitter 27 transmits the data of the instrument information stored in the data collecting memory 25, to the support center along with the image data and the like.

Since the configuration is adopted in which the data of the instrument information (e.g., the engine information and the voyage information) is transmitted to the support center along with the image data, the operator of the support center can surely grasp the engine information, the voyage information and the like at the timing of the abnormality occurrence as described above. Thus, the operator can more accurately determine the cause of the abnormality.

Note that, for example, the display image data illustrated in FIG. 2 includes the instrument information display area 22 for displaying the instrument information (e.g., the engine information and the voyage information). Therefore, in this case, since the operator of the support center can check the transmitted display image data and confirm the contents of the instrument information, additional data of the instrument information is not needed. However, depending on the display setting performed by the user, there is a case where the instrument information display area 22 is not included in the display image data (the instrument information is not displayed on the display unit 2). In such a case, with only the transmitted display image data, the operator of the support center cannot confirm the instrument information (e.g., the engine information and the voyage information) at the timing of the abnormality occurrence. Therefore, it is meaningful to store the instrument information separately to the display image data as described above and transmit it to the support center.

Further, the data collecting memory 25 of this embodiment, when the report button 26 is controlled, also stores the data of the setting information stored in the setting information memory 24. Then, the transmitter 27 transmits the data of the setting information stored in the data collecting memory 25, to the support center along with the image data and the like.

As described above, the setting information memory 24 stores the display setting performed by the user. Therefore, the data of the display setting is also stored in the data collecting memory 25 and transmitted to the support center.

Note that, since the values of the display setting are the setting values for internal settings to generate the display image data, for example, except when the display screen for setting is displayed, the values of the display setting are never displayed on the display unit 2 themselves. In this regard, it can be said that the values of the display setting are information which is not displayed on the display unit 2. Thus, since the values of the display setting are the information which is not directly displayed on the display unit 2, it is meaningful to store it separately to the display image data and transmit it to the support center.

The operator of the support center can, by referring to the values of the display setting transmitted along with the display image data, grasp the setting performed when the display image data is generated, and thus, he/she can suitably evaluate the display image data. Therefore, the operator can more accurately determine the cause of the abnormality occurring in the display device 1.

Moreover, as described above, the setting information memory 24 also stores the setting values regarding the respective sensors. Therefore, the setting information to be transmitted to the support center includes the setting values regarding the respective sensors.

Specifically, the operator of the support center can, by referring to the setting values regarding the respective sensors, find out the setting condition under which the image data (the chart, the radar image, and the fish finding image) stored in the background memories at the timing of the abnormality occurrence is generated. Based on this, the operator can determine the cause of the abnormality more accurately.

As described above, the display device 1 of this embodiment includes the background memories 14, 15 and 16, the display unit 2, and the data collecting memory 25. The background memories 14, 15 and 16 store the plurality of kinds of image data (the radar image, the fish finding image, and the chart) generated based on the information from the different kinds of plurality of sensors (the radar apparatus 5, the fish finder 6, and the GPS antenna 4), respectively. Among the plurality of kinds of image data, the display unit 2 displays the image data selected by the user. Then, at the timing of the input of the report instruction by the user, the data collecting memory 25 stores the data of the image displayed on the display unit 2 and also the image data stored in the background memories 14, 15 and 16 at the timing of the input of the report instruction.

The image data stored in the background memories 14, 15 and 16 at least includes the image data which is not displayed on the display unit 2 (non-displayed image data) at the timing of the input of the report instruction. Therefore, storing the image data in the background memories (including the image data which is not displayed on the display unit 2) can be useful, when abnormality or the like occurs, in determining the cause of the abnormality.

Although the preferred embodiment of the present invention is described above, the above configuration may be modified as follows.

In the above embodiment, the control of the report button 26 by the user corresponds to inputting the report instruction; however, the interface for performing the report instruction is not limited to the button, and it may be any interface as long as the user can control.

For example, the user may control the GUI component and the like displayed on the display unit 2 to input the report instruction. Note that, in this case, for example, when the GUI is frozen, the report instruction cannot be inputted. In this regard, since the report button 26 of the above embodiment is configured as a physical button, the input can be performed even if abnormality occurs, for example, when the GUI is frozen.

Moreover, alternatively/in addition to the input by the user, the report instruction may be given automatically based on some sort of condition.

In the above embodiment, when the latest data is newly stored in the data collecting memory 25, the transmitter 27 automatically transmits the data; however, it is not limited to this. For example, the data may be transmitted by a clear instruction from the user.

The external instrument of the destination of the data from the transmitter 27 is not limited to the server of the support center. For example, the transmitter 27 may transmit the data stored in the data collecting memory 25 to a cloud server on internet.

The transmitter 27 of the above embodiment transmits all the data newly stored in the data collecting memory 25; however, not limited to this, the transmitter 27 may only transmit a part of the data. In this case, the kind of the data to be transmitted from the transmitter 27 may be specified by the user.

The transmitter 27 may be omitted. In this case, the user can move the data stored in the data collecting memory 25 to another device, for example, a PC (Personal Computer) at the user's house by a suitable means, and transmit the data to the support center by attaching it to an electronic mail, for example. As described above, the data stored in the data collecting memory 25 may be transmitted by an external means of the display device 1.

Alternatively, the user does not necessarily transmit the data. For example, the user can directly bring the display device 1 with the abnormality to the support center. In this case, the operator of the support center can determine the cause of the abnormality by analyzing the data stored in the data collecting memory 25 of the brought display device 1.

The area of the data collecting memory 25 to store the data may be a memory area built in the display device 1 or an area in a removable medium, such as a flash memory.

The display device 1 of the above embodiment generates the three kinds of image data (the chart, the radar image, and the fish finding image) based on the three different kinds of information; however, the number of kinds of image data which is handled by the display device 1 may be two kinds, or four or more kinds.

The display device 1 of the above embodiment can be connected to the radar apparatus 5 and the fish finder 6; however, either one or both of the radar apparatus 5 and the fish finder 6 may be omitted. Moreover, alternatively/in addition to the radar apparatus 5 and the fish finder 6, other device used in ships, for example, a scanning sonar may be able to be connected. In this case, the display device 1 generates the image data of the scanning sonar based on the information obtained by the scanning sonar, and stores the generated image data in the corresponding background memory(ies).

Among the instrument information and the setting information, the data collecting memory 25 may selectively store only the required information. Alternatively, the storing of the instrument information and the setting information may be omitted.

The data collecting memory 25 may store other kinds of information at the timing of the input of the report instruction, in addition to the information described above. For example, the data collecting memory 25 can store, when the report instruction is given, data of a log of an alarm issued in the past in the display device 1. By this, the log at the timing of the abnormality occurrence can be stored, and thus, the log can be used in determining the cause of the abnormality.

In the above embodiment, the data collecting memory 25 stores the display image data (the data of the image displayed on the display unit 2), and the image data stored in the background memories. However, by omitting the storing of the display image data, it may be such that only the image data stored in the background memories is stored.

Moreover, the display device 1 of the above embodiment has the function as the GPS plotter; however, not limited to this, the function as the plotter may be omitted.

Moreover, the configuration of the disclosure herein is not limited to a display device for ships, and may broadly be applied to display devices which generate and display images based on acquired information.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A display device, comprising:
 memories configured to store a plurality of kinds of image data generated based on information acquired from different kinds of sensors, respectively;
 a display unit configured to display image data that is selected by a user among the plurality of kinds of image data, wherein each selected kind of image data is displayed on a respective separate display area of the display unit, wherein the image data that is selected by the user includes non-displayed image data not displayed on the display unit and displayed image data displayed on the display unit; and
 a data collecting memory configured to store, in response to a predetermined report instruction, at least the selected displayed image data of an image displayed on the display unit at the timing of the report instruction and, among the image data stored in the memories at the timing of the report instruction, the selected non-displayed image data that is not displayed on the display unit, wherein
 in the image data stored in any one of the memories, when only a part of the image data is displayed on the display unit, the data collecting memory stores, as the non-displayed image data, at least a part of the image data corresponding to an area outside a displayed area of the display unit.

2. The display device of claim 1, wherein in response to the report instruction, the data collecting memory also stores a display setting value of the display unit at the timing of the report instruction.

3. The display device of claim 1, wherein in response to the report instruction, the data collecting memory also stores setting values of the sensors at the timing of the report instruction.

4. The display device of claim 1, further comprising a user interface through which the report instruction is inputted.

5. The display device of claim 1, wherein the sensors include at least one of a radar apparatus, a fish finder, and a GPS receiver.

6. The display device of claim 1, wherein instrument data is displayable on the display unit, along with the image data selected by the user, and
 wherein in response to the report instruction, the data collecting memory also stores the instrument data at the timing of the report instruction.

7. The display device of claim 1, wherein the data collecting memory stores, as the non-displayed image data, the image data of a kind at least different from the image data displayed on the display unit.

8. The display device of claim 1, further comprising a transmitter configured to transmit the data stored in the data collecting memory to an external instrument.

9. The display device of claim 8, wherein when the data collecting memory newly stores data in response to the report instruction, the transmitter determines whether the data is transmittable, and the transmitter transmits the data when the data becomes transmittable.

10. An information collecting method of a display device, comprising:
 generating, based on information acquired from different kinds of sensors, a plurality of kinds of image data corresponding to the sensors, respectively;
 storing the plurality of kinds of generated image data in memories, respectively;
 displaying, on a display unit, image data that is selected by a user among the plurality of kinds of image data, wherein each selected kind of image data is displayed on a respective separate display area of the display unit, wherein the image data that is selected by the user includes non-displayed image data not displayed on the display unit and displayed image data displayed on the display unit; and storing, in response to a predetermined report instruction, at least the selected displayed image data of an image displayed on the display unit at the timing of the report instruction and, among the image data stored in the memories at the timing of the report instruction, the selected non-displayed image data that is not displayed on the display unit, wherein in the image data stored in any one of the memories, when only a part of the image data is displayed on the display unit, the data collecting memory stores, as the non-displayed image data, at least a part of the image data corresponding to an area outside a displayed area of the display unit.

11. The information collecting method of claim 10, wherein in response to the report instruction, further storing a display setting value of the display unit at the timing of the report instruction.

12. The information collecting method of claim 10, wherein in response to the report instruction, further storing setting values of the sensors at the timing of the report instruction.

13. The information collecting method of claim 10, further wherein the report instruction is received from a user interface.

14. The information collecting method of claim 10, wherein the sensors include at least one of a radar apparatus, a fish finder, and a GPS receiver.

15. The information collecting method of claim 10, wherein instrument data is displayable on the display unit, along with the image data selected by the user, and wherein in response to the report instruction, further storing the instrument data at the timing of the report instruction.

16. The information collecting method of claim 10, wherein storing the image data of a kind at least different from the image data displayed on the display unit.

17. The information collecting method of claim 10, further comprising transmitting the data stored in response to a predetermined report instruction to an external instrument.

18. The information collecting method of claim 17, wherein newly storing data in response to the report instruction, determining whether the data is transmittable, and transmitting the data when the data becomes transmittable.

* * * * *